United States Patent
Tani et al.

(10) Patent No.: US 11,552,696 B2
(45) Date of Patent: Jan. 10, 2023

(54) RELAY STATION, CONTROL STATION, DATA TRANSMISSION SYSTEM, DATA TRANSMISSION METHOD, CONTROL CIRCUIT, AND RECORDING MEDIUM

(71) Applicant: MITSUBISHI ELECTRIC CORPORATION, Tokyo (JP)

(72) Inventors: Shigenori Tani, Tokyo (JP); Katsuyuki Motoyoshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 90 days.

(21) Appl. No.: 17/090,201

(22) Filed: Nov. 5, 2020

(65) Prior Publication Data

US 2021/0058138 A1 Feb. 25, 2021

Related U.S. Application Data (63) Continuation of application No. PCT/JP2018/020453, filed on May 29, 2018.

(51) Int. Cl.
*H04B 7/10* (2017.01)
*H04B 7/204* (2006.01)

(52) U.S. Cl.
CPC ............ *H04B 7/10* (2013.01); *H04B 7/2041* (2013.01)

(58) Field of Classification Search
CPC ...... H04B 71/10; H04B 7/185; H04B 7/1851; H04B 7/18508; H04B 7/18521; H04B 7/18523; H04B 7/18576; H04B 7/2041
See application file for complete search history.

(56) References Cited

U.S. PATENT DOCUMENTS

| | | | |
|---|---|---|---|
| 5,754,138 A | 5/1998 | Turcotte et al. | |
| 8,130,140 B2* | 3/2012 | Draganov | H04B 7/2041 342/373 |
| 8,712,321 B1* | 4/2014 | Dankberg | H04B 7/2041 455/12.1 |
| 9,730,227 B2* | 8/2017 | Marsh | H04B 7/18539 |
| 10,211,912 B2* | 2/2019 | Tani | H04B 7/2041 |
| 10,355,775 B2* | 7/2019 | Kay | H04B 7/2041 |
| 10,511,378 B2* | 12/2019 | Freedman | H04B 7/18515 |
| 11,271,639 B2* | 3/2022 | Tani | H04B 7/155 |
| 2009/0286467 A1* | 11/2009 | Miller | H04B 7/2041 455/3.02 |

(Continued)

OTHER PUBLICATIONS

Digital Video Broadcasting (DVB), Implementation guidelines for the second generation system for Broadcasting, Interactive Services, News Gathering and other broadband satellite applications; Part 2-S2 Extensions (DVB-S2X), DVB Document A171-2, Mar. 2015, total 183 pages.

(Continued)

*Primary Examiner* — Chi H Pham
*Assistant Examiner* — Weibin Huang
(74) *Attorney, Agent, or Firm* — Birch, Stewart, Kolasch & Birch, LLP (57) ABSTRACT

A relay station includes a beam formation unit capable of emitting multiple beams to multiple respective emission areas. The beam formation unit forms clusters each from two or more of the emission areas, and emits the beams based on assignment information indicating which slot is assigned to which of the emission areas on a per cluster basis. One emission area belongs to multiple clusters.

14 Claims, 9 Drawing Sheets

(56) References Cited

U.S. PATENT DOCUMENTS

| | | | |
|---|---|---|---|
| 2010/0194630 A1* | 8/2010 | Draganov | H04B 7/2041 |
| | | | 342/373 |
| 2011/0039547 A1* | 2/2011 | van Rensburg | H04W 72/1226 |
| | | | 455/450 |
| 2016/0277095 A1 | 9/2016 | Marsh et al. | |
| 2018/0041270 A1* | 2/2018 | Buer | H04W 56/001 |
| 2018/0123674 A1* | 5/2018 | Freedman | H04B 7/18513 |
| 2022/0278742 A1* | 9/2022 | Gineste | H04B 7/18517 |

OTHER PUBLICATIONS

Extended European Search Report dated Apr. 19, 2021 in the corresponding European Patent Application No. 18921129.5.
European Office Action for European Application No. 18 921 129.5, dated Feb. 1, 2022.

* cited by examiner

| BEAM NUMBER | REQUESTED NUMBER OF SLOTS OF EACH BEAM | CLUSTER NUMBER | REQUESTED NUMBER OF SLOTS OF EACH CLUSTER | NUMBER OF SLOTS ASSIGNED TO EACH BEAM | |
|---|---|---|---|---|---|
| B1 | 1 | C1 | 20 | 1 | |
| B2 | 3 | | | 3 | |
| B3 | 2 | | | 2 | |
| B4 | 1 | | | 1 | |
| B5 | 5 | | | 3 | 2 |
| B6 | 3 | C2 | 18 | 0 | 3 |
| B7 | 4 | | | 0 | 4 |
| B8 | 1 | | | 0 | 1 |
| B9 | 2 | | | 0 | 2 |
| B10 | 1 | | | 0 | 1 |
| B11 | 1 | | | 0 | 1 |
| B12 | 1 | C3 | 10 | 0 | 1 |
| B13 | 1 | | | | 1 |
| B14 | 1 | | | | 1 |
| B15 | 2 | | | | 2 |
| B16 | 1 | | | | 1 |

RELAY STATION, CONTROL STATION, DATA TRANSMISSION SYSTEM, DATA TRANSMISSION METHOD, CONTROL CIRCUIT, AND RECORDING MEDIUM

CROSS-REFERENCE TO RELATED APPLICATION

This application is a continuation application of International Application PCT/JP2018/020453, filed on May 29, 2018, and designating the U.S., the entire contents of which are incorporated herein by reference.

BACKGROUND OF THE INVENTION

1. Field of the Invention

The disclosure relates to a relay station that relays data from a transmitting station to a receiving station, to a control station that controls the relay station, to a data transmission system, to a data transmission method, to a control circuit, and to a recording medium.

2. Description of the Related Art

A cellular system includes a base station, which is provided in each cell to communicate with a terminal having communication functionality, such as a mobile phone, located in that cell. Such cellular system undergoes an increase in transmission capacity requirement with an increase in the number of users and with an increase in the complexity of content. A cellular system uses, as one method to increase the transmission capacity, a method that increases the total available bandwidth by means of a frequency reuse technique, in which neighboring base stations in cells subjected to strong interference from each other use different frequencies from each other, while base stations in cells subjected to sufficiently low interference from each other use the same frequency. In addition, consideration is made to a recent cellular system to use, additionally to the conventional frequency, a frequency band such as a millimeter wave that is higher than the conventional frequency to provide a wider frequency band. Moreover, consideration is also made to a cellular system that forms a cell using a narrow-band multi-beam configuration to increase the signal-to-noise ratio to communicate using multilevel transmission. Furthermore, a satellite communication system, which uses an artificial satellite operating in cosmic space, or the like, to allow communication between two points with a terminal on a ship or aircraft on the earth, utilizes a multi beam configuration, in which the artificial satellite reuses the same frequency or the same polarized wave in areas subjected to sufficiently low inter-beam interference during data transmission thus to increase the transmission capacity.

A cellular system and a satellite communication system can expect an increase in the data transmission capacity by use of a multi-beam configuration, which will improve the efficacy of frequency reuse. On the other hand, use of a multi-beam configuration requires transmitters provided in a base station, an artificial satellite, a relay station, and the like to simultaneously form multiple beams to be emitted to terminals, thereby increasing the numbers of frequency converters and of amplifiers in association with the multiple-beam emission. This presents a problem in increases in the weight, in the power consumption, and in cost. Non-Patent Literature (Digital Video Broadcasting (DVB), Implementation guidelines for the second generation system for Broadcasting, Interactive Services, News Gathering and other broadband satellite applications; Part 2-S2 Extensions (DVB-S2X)) discloses a beam hopping technique that switches beams emitted to multiple locations in the time domain. A beam hopping technique is a technique that performs so-called time division emission, in which a group called cluster is formed using multiple beams covering the coverage area, and beams emitted to multiple locations are switched from one to another within the cluster in the time domain. Time division emission in a beam hopping technique is controlled with a period corresponding to a frame. In a beam hopping technique, a beam emitted changes from slot to slot, the slots being generated by division of a frame. That is, since the beams corresponding to one frame are emitted to one cluster during a control period, use of a beam hopping technique results in the number of beams simultaneously emitted to terminals by a transmitter being the same as the number of clusters. This can prevent increase in the numbers of frequency converters and of amplifiers in association with beam emission as compared to when all beams are simultaneously emitted to terminals.

However, the beam hopping technique described in above Non-Patent Literature switches the beams within a cluster in the time domain for emission. This limits the maximum value of the transmission capacity of each cluster to the transmission capacity when one beam is constantly emitted. If terminals are heterogeneously located within the coverage area of a transmitter, the traffic demands requested by the respective terminals may be imbalanced among clusters. In this case, a cluster having traffic demands greater than a maximum transmission capacity per cluster will suffer from a deficiency in slots to be assigned. In contrast, a cluster having traffic demands less than the maximum transmission capacity will have excess slots to be assigned. This will require as many beams as the traffic demands exceeding the maximum transmission capacity to be emitted in another control period even though a cluster exists that has excess slots to be assigned. This presents a problem in reductions in time efficiency and in use efficiency of frequency in association with data transmission.

The disclosure has been made in view of the foregoing, and it is an object of the disclosure to provide a relay station that limits or prevents a reduction in time efficiency and a reduction in use efficiency of frequency in association with data transmission.

SUMMARY OF THE INVENTION

To solve the aforementioned problems and achieve the object, a relay station according to an aspect of the disclosure includes: a beam formation unit capable of emitting a plurality of beams to a plurality of respective emission areas, the beam formation unit forming clusters each from two or more of the emission areas and emitting the beams based on assignment information indicating which slot is assigned to which of the emission areas for each of the clusters, wherein one of the emission areas belongs to multiple ones of the clusters.

DETAILED DESCRIPTION OF THE PREFERRED EMBODIMENTS

A relay station, a control station, a data transmission system, a data transmission method, a control circuit, and a recording medium according to embodiments of the disclosure will be described in detail below with reference to the drawings.

First Embodiment

Figure 1:
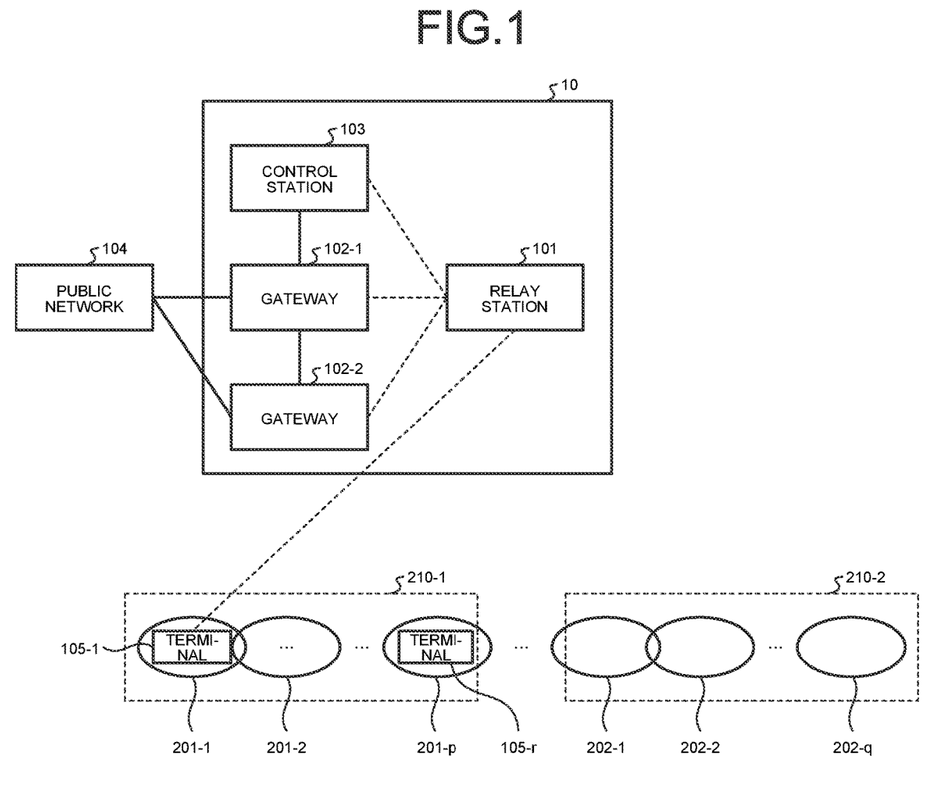
FIG. 1 is a diagram illustrating an example of configuration of a data transmission system according to a first embodiment.

FIG. 1 is a diagram illustrating an example of configuration of a data transmission system according to a first embodiment. A data transmission system 10 is, for example, a cellular system or a satellite communication system. The data transmission system 10 includes a relay station 101, a gateway 102-1, a gateway 102-2, and a control station 103. In FIG. 1, a dotted line indicates wireless communication, and a solid line indicates wired communication. The gateway 102-1 and the gateway 102-2 are connected to a public network 104 to provide a service of another communication system (not illustrated) outside the data transmission system 10 to terminals 105 through the Internet and through the relay station 101. Note that if no service of another communication system is to be used, and communication will thus be complete within the data transmission system 10, the gateway 102-1 and the gateway 102-2 do not need to be connected to the public network 104. In addition, although FIG. 1 illustrates two gateways being installed, the number of the gateways is not limited to two, and multiple gateways may be installed for redundancy. The gateway 102-1 and the gateway 102-2 are each referred to as gateway 102 when no distinction needs to be made. The control station 103 controls beam hopping operation performed by the relay station 101.

Emission areas 201-1 to 201-$p$ and emission areas 202-1 to 202-$q$ each represent an emission area, on the ground, of a beam that the relay station 101 can emit. The relay station 101 forms a cluster 210-1 including the emission areas 201-1 to 201-$p$. Similarly, the relay station 101 forms a cluster 210-2 including the emission areas 202-1 to 202-$q$. The emission areas 201-1 to 201-$p$ and the emission areas 202-1 to 202-$q$ are each referred to as emission area 200 when no distinction needs to be made. Note that the number of the emission areas 200 is not limited to the number illustrated as the emission areas 201-1 to 201-$p$ and the emission areas 202-1 to 202-$q$. In addition, although the cluster 210-1 and the cluster 210-2 are illustrated in the present embodiment, the number of clusters is not limited to two. The cluster 210-1 and the cluster 210-2 are each referred to as cluster 210 when no distinction needs to be made.

A terminal 105-1 is located in the emission area 201-1, and the relay station 101 emits a beam onto the emission area 201-1 to transmit data to the terminal 105-1. Similarly, a terminal 105-$r$ is located in the emission area 201-$p$, and the relay station 101 emits a beam onto the emission area 201-$p$ to transmit data to the terminal 105-$r$. The terminals 105-1 to 105-$r$ are each referred to as terminal 105 when no distinction needs to be made. Note that FIG. 1 illustrates the emission area 201-1 as including the terminal 105-1 only, but the emission area 201-1 may include multiple terminals 105. Note that in a case in which the data transmission system 10 is a cellular system, a device including both the relay station 101 and the control station 103 is called base station. In addition, in a case in which the data transmission system 10 is a satellite communication system, the relay station 101 will be a repeater installed in an artificial satellite.

Figure 2:
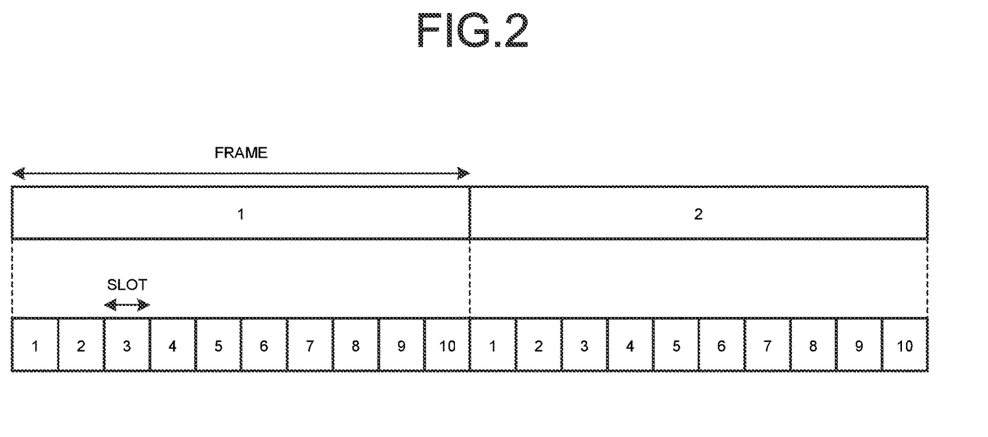
FIG. 2 is a diagram illustrating a frame according to the first embodiment.

FIG. 2 is a diagram illustrating a frame according to the first embodiment. The present embodiment is described on an assumption that one frame includes ten slots. Note that the number of slots in one frame is not limited to ten in the present embodiment. The time division emission to each of the clusters 210 in a beam hopping technique is controlled with a period corresponding to the frame illustrated in FIG. 2. In addition, the relay station 101 changes the emission area 200 to irradiate at every slot generated by division of the frame.

Figure 3:
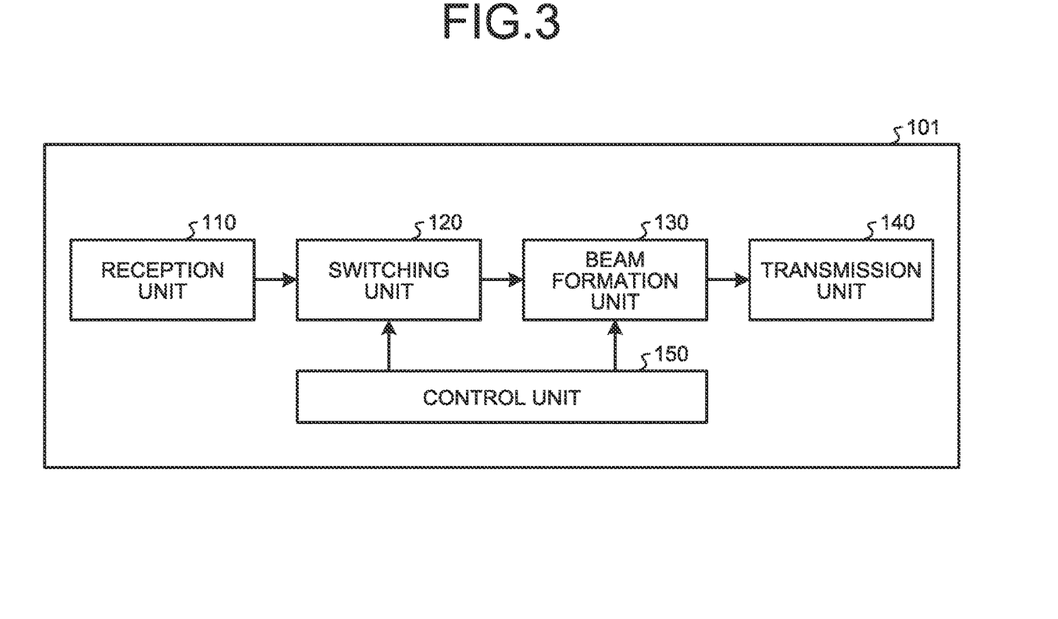
FIG. 3 is a diagram illustrating functional blocks of the relay station according to the first embodiment.

An operation of the relay station 101 and the control station 103 according to the present embodiment will now be described. Note that the gateway 102 and the terminal 105 have no particular features in the present embodiment, and such features are conceivable to persons skilled in the art. Detailed description of the configuration thereof will therefore be omitted. FIG. 3 is a diagram illustrating functional blocks of the relay station 101 according to the first embodiment. The relay station 101 includes a reception unit 110, a switching unit 120, a beam formation unit 130, a transmission unit 140, and a control unit 150. The reception unit 110 receives data transmitted by the gateway 102. The switching unit 120 assigns the slots generated by division of a frame to the emission areas 200. The beam formation unit 130 forms the emission areas 200 and the clusters 210. The transmission unit 140 transmits data to the terminal 105. A detailed operation of these functional units will be described later herein.

Figure 4:
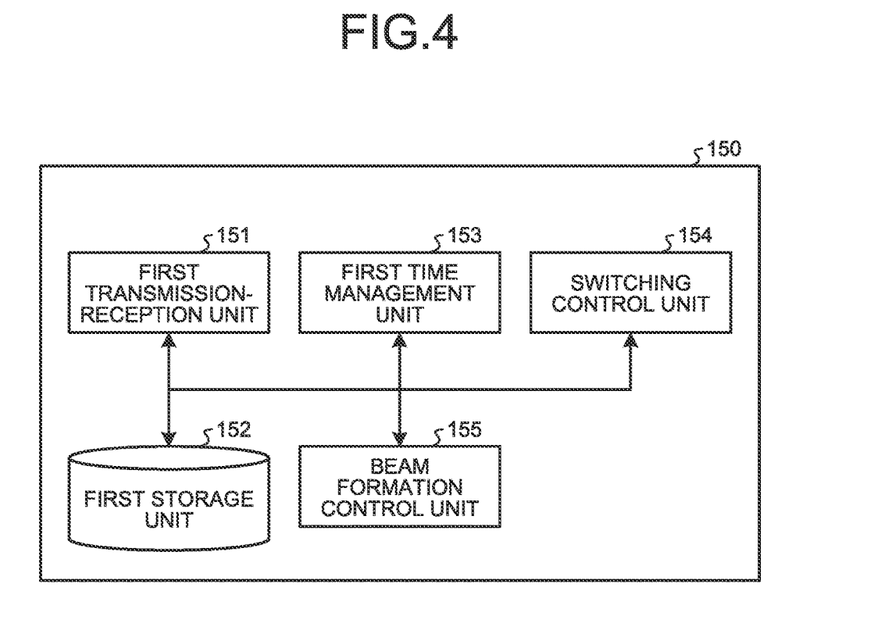
FIG. 4 is a diagram illustrating functional blocks of the control unit according to the first embodiment.

FIG. 4 is a diagram illustrating functional blocks of the control unit 150 according to the first embodiment. The control unit 150 includes a first transmission-reception unit 151, a first storage unit 152, a first time management unit 153, a switching control unit 154, and a beam formation control unit 155. The first transmission-reception unit 151 receives data transmitted by the control station 103, and transmits the data to the first storage unit 152. The first storage unit 152 stores the data transmitted by the first transmission-reception unit 151. The first time management unit 153 synchronizes the time with the control station 103. The switching control unit 154 generates data needed by the switching unit 120 to assign the slots to the emission areas 200. The beam formation control unit 155 generates data needed by the beam formation unit 130 to form the emission areas 200. A detailed operation of these functional units will be described later herein.

Figure 5:
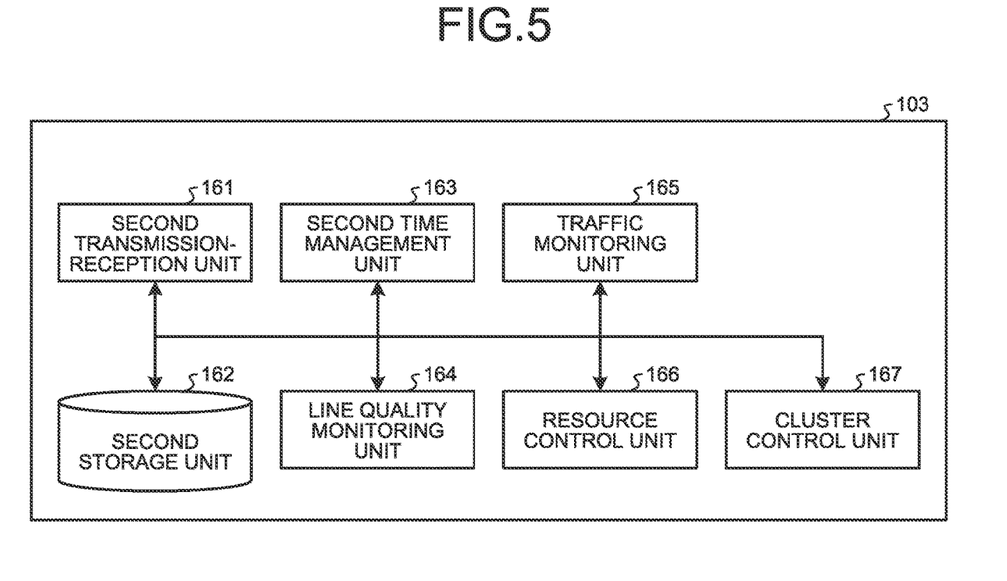
FIG. 5 is a diagram illustrating functional blocks of the control station according to the first embodiment.

FIG. 5 is a diagram illustrating functional blocks of the control station 103 according to the first embodiment. The control station 103 includes a second transmission-reception unit 161, a second storage unit 162, a second time management unit 163, a line quality monitoring unit 164, a traffic monitoring unit 165, a resource control unit 166, and a cluster control unit 167. The second transmission-reception unit 161 receives data from the gateway 102, and transmits the data received to the second storage unit 162. The second storage unit 162 stores the data transmitted by the second transmission-reception unit 161. The second transmission-reception unit 161 also transmits data needed for control of the relay station 101 to the relay station 101. The second transmission-reception unit 161 is also referred to as transmission-reception unit. The second time management unit 163 synchronizes the time with the relay station 101. The line quality monitoring unit 164 monitors line quality of the lines for communication used by the terminals 105. The traffic monitoring unit 165 monitors the traffic amounts requested by the terminals 105. The resource control unit 166 adds up the requested numbers of slots of the respective emission areas 200. The cluster control unit 167 changes the combination of the emission areas 200 that constitute the cluster 210. A detailed operation of these functional units will be described later herein.

The reception unit 110, the switching unit 120, the beam formation unit 130, the transmission unit 140, the control unit 150, the second transmission-reception unit 161, the second storage unit 162, the second time management unit 163, the line quality monitoring unit 164, the traffic monitoring unit 165, the resource control unit 166, and the cluster control unit 167 according to the first embodiment are implemented a processing circuitry that is an electronic circuit for performing corresponding processes.

This processing circuitry may be a dedicated hardware element or a control circuit including a memory and a central processing unit (CPU) that executes a program stored in the memory. As used herein, the term memory means, for example, a non-volatile or volatile semiconductor memory such as a random access memory (RAM), a read-only memory (ROM), or a flash memory; a magnetic disk, an optical disk, or the like. In a case in which this processing circuitry is a control circuit including a CPU, this control circuit is, for example, a control circuit 300 configured as illustrated in FIG. 6.

Figure 6:
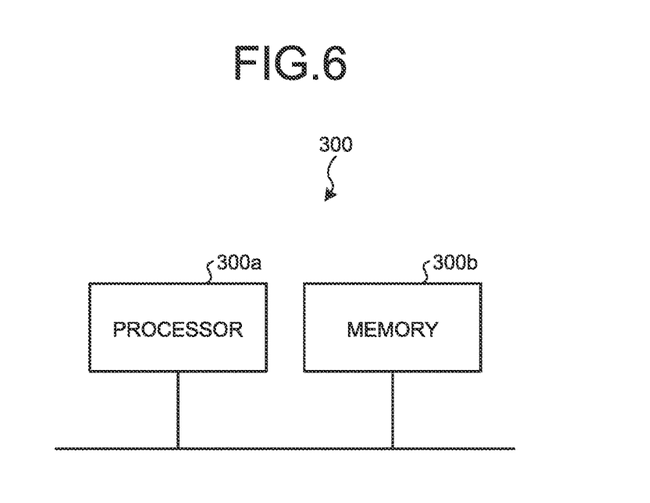
FIG. 6 is a diagram illustrating the control circuit according to the first embodiment.

As illustrated in FIG. 6, the control circuit 300 includes a processor 300a, which is the CPU, and a memory 300b. In the case of implementation in the control circuit 300 illustrated in FIG. 6, functionality is implemented by the processor 300a by reading and executing a program corresponding to an intended process stored in the memory 300b. The memory 300b is also used as a temporary memory during processes performed by the processor 300a.

Figure 7:
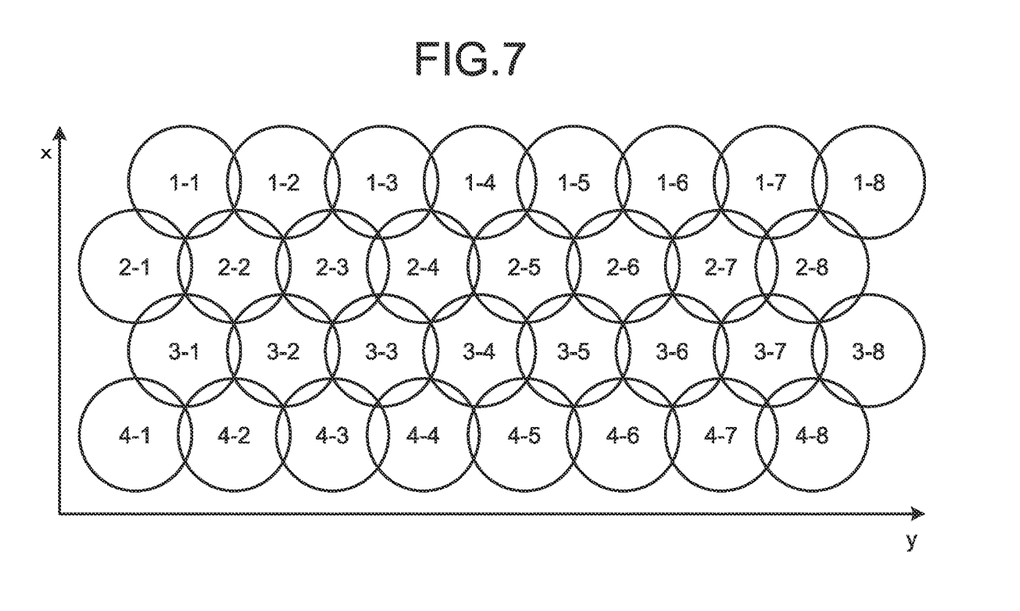
FIG. 7 is a diagram illustrating an example arrangement of emission areas covered by the relay station according to the first embodiment.

An operation of the relay station 101 and the control station 103 will now be described in detail. FIG. 7 is a diagram illustrating an example arrangement of the emission areas 200 covered by the relay station 101 according to the first embodiment. The chart of FIG. 7 uses the vertical axis as representing an x-direction and the horizontal axis as representing a y-direction. The emission areas 200 are assigned indices. For example, the emission area at the bottom left corner in FIG. 7 is assigned an index of 4-1. In addition, the left-side value and the right-side value of the index assigned to an emission area 200 are respectively referred to as x value and y value. The x value decreases in the positive x-direction, direction, and the y value increases in the positive y-direction. For example, the emission area at the bottom left corner in FIG. 7 has an x value or 4, and a y value of 1.

Formation of the clusters 210 each using the emission areas 200 results in a coverage area of the data transmission system 10 having a planar arrangement, i.e., an arrangement extending in two independent directions. In such arrangement, emission of beams to respective neighboring emission areas 200 at the same time, at the same frequency, or using the same polarized wave will cause the beams to interfere with each other. Accordingly, the resource control unit 166 assigns the beams such that the polarized wave of the beam emitted to an emission area 200 having an odd-numbered x value and the polarized wave of the beam emitted to an emission area 200 having an even-numbered x value, of the indices assigned to the emission areas 200, are perpendicular to each other. Note that the term polarized wave includes a linearly polarized wave and a circularly polarized wave. Alternatively, the resource control unit 166 assigns beams having different frequencies respectively to an emission area 200 assigned an odd-numbered x value and to an emission area 200 assigned an even-numbered x value. Assignment of different polarized waves or different frequencies to beams emitted to respective emission areas 200 depending on the x value as described above results in a combination of beams having the same frequency or having the same polarized wave arranged only in the y-direction. Accordingly, by use of time division emission using a beam hopping technique, the irradiated location that will cause interference between multiple beams at a level of a certain value or lower can be determined only along a line in the y-direction, that is, one-dimensionally. Then, the beam formation unit 130 emits a beam having a polarized wave and a frequency assigned by the resource control unit 166 to the terminal 105.

Figure 8:
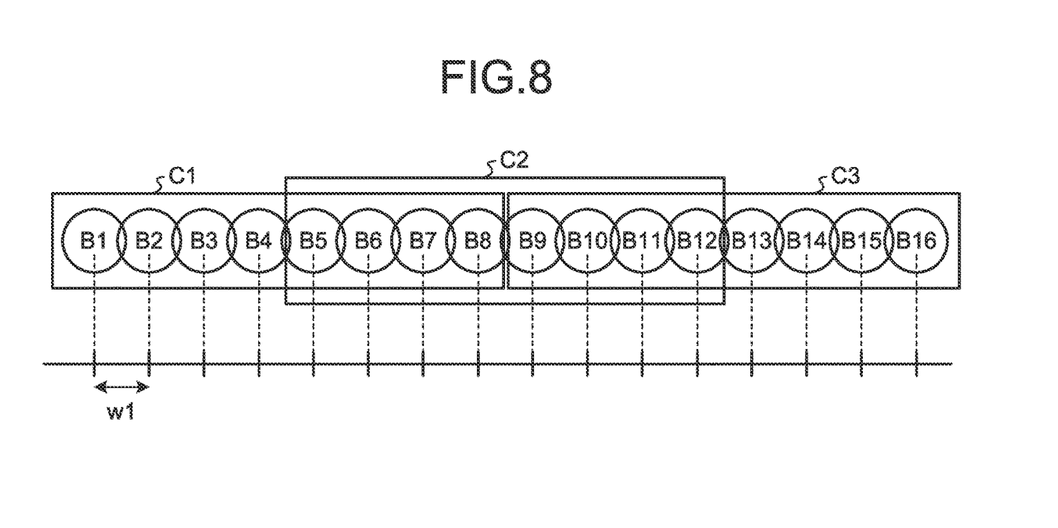
FIG. 8 is a diagram illustrating an example of relationships between emission areas and clusters according to the first embodiment.

FIG. 8 is a diagram illustrating an example of relationships between the emission areas 200 and the clusters 210 according to the first embodiment. The present embodiment assumes that one emission area 200 may belong to multiple ones of the clusters 210. FIG. 8 illustrates the emission areas 200 as emission areas B1 to B16. FIG. 8 also illustrates that there are clusters C1 to C3, and the clusters 210 are formed to each include e eight of the emission areas 200. The emission areas B1 to B8 belong to the cluster C1. The emission areas B5 to B12 belong to the cluster C2. The emission areas B9 to B16 belong to the cluster C3. That is, the emission areas B5 to B8 belong to two clusters: the cluster C1 and the cluster C2; and the emission areas B9 to B12 belong to two clusters: the cluster C2 and the cluster C3.

Note FIG. 8 illustrates the clusters 210 as being configured such that the same number of emission areas 200 belong to each of the clusters 210, and the same number of emission areas 200 redundantly belong to each of the clusters 210, but this is merely an example. The numbers of the emission areas 200 belonging to the respective clusters 210, or the numbers of the emission areas 200 belonging redundantly to the respective clusters 210, may differ by each cluster 210. In addition, a distance w1 represents the distance be emission areas 200. The present embodiment assumes that the distance w1 between emission areas 200 is a fixed distance that inhibits mutual overlapping of the emission areas 200. Note that although FIG. 8 illustrates a case in which the emission areas B1 to B16 are linearly arranged, but the arrangement is not limited thereto. The emission areas B1 to B16 may also be linearly arranged along a curved line to form the clusters 210.

Figure 9:
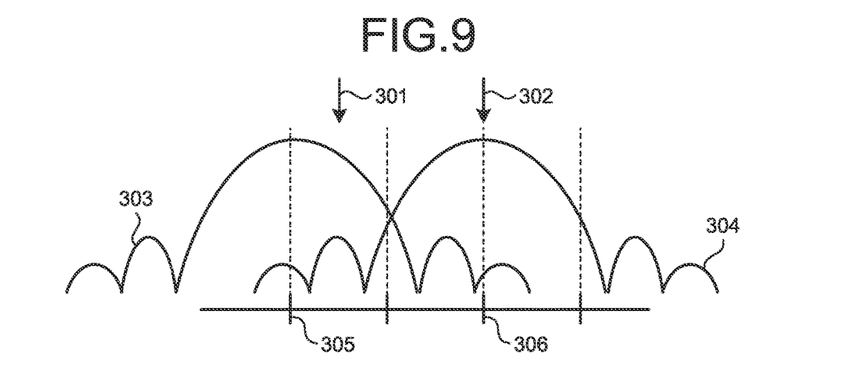
FIG. 9 is a diagram illustrating an example of locations of terminals and beam patterns according to the first embodiment.

FIG. 9 is a diagram illustrating an example of locations of the terminals 105 and the beam patterns according to the first embodiment. In FIG. 9, a location 301 and a location 302 represent the locations of the respective terminals 105. A beam pattern 303 and a beam pattern 304 represent the beam patterns of the respective beams emitted by the relay station 101. In addition, a coordinate point 305 and a coordinate point 306 represent the center coordinate points of the respective emission areas 200. The present embodiment assumes that the relay station 101 emits a beam limitedly to the center coordinate point of each of the emission areas 200.

Figure 10:
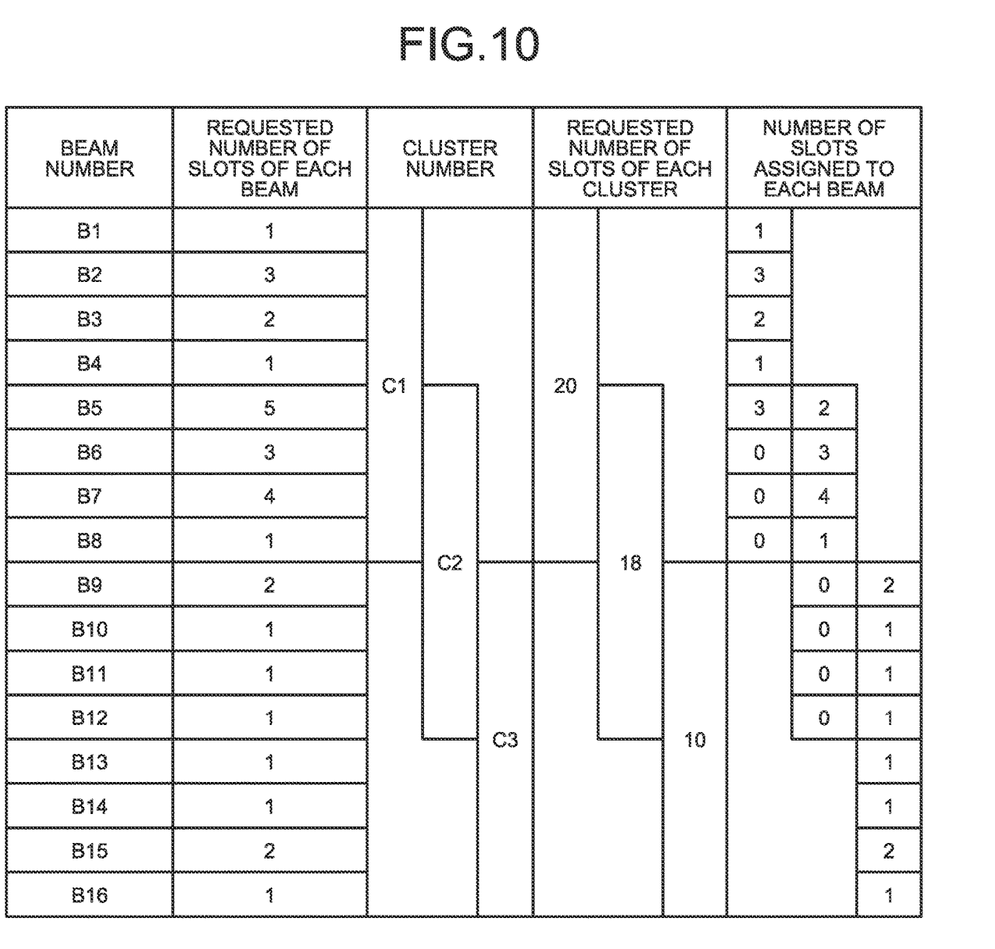
FIG. 10 is a diagram illustrating an example of slot assignment according to the first embodiment.

FIG. 10 is a diagram illustrating an example of slot assignment according to the first embodiment. FIG. 10 illustrates an example of slot assignment for the configuration of the clusters 210 illustrated in FIG. 8. FIG. 10 includes the beam number, the requested number of slots of each beam, the cluster number, the requested number of slots of each cluster, and the number of slots assigned to each beam. One frame is assumed to include ten slots similarly to the frame illustrated in FIG. 2. The beam numbers are similar to the numbers of the emission areas B1 to B16 illustrated in FIG. 8. The cluster numbers are similar to the numbers of the clusters C1 to C3 illustrated in FIG. 8. In addition, one cluster is assigned one frame, i.e., ten slots, illustrated in FIG. 2 per control period. The requested number of slots of each beam represents the number of slots requested by the terminal(s) 105 located in that emission area 200. For example, the number of slots requested by the terminal(s) 105 located in the emission area B1 is 1, and the number of slots requested by the terminal(s) 105 located in the emission area B5 is 5. The number of slots requested by the terminal(s) 105 is calculated based on the traffic amount requested by the terminal(s) 105. The requested number of slots of each cluster represents the sum of the requested numbers of slots of the respective emission areas 200 for each of the clusters 210. The number of slots assigned to each beam represents the number of slots assigned by the control station 103 with respect to the requested number of slots of each beam. As illustrated in FIG. 10, the cluster C2 includes the emission areas B5 to B12 belonging to either the cluster C1 or the cluster C3. Thus, when the requested number of slots of the cluster C1 is greater than 10, assignment of as many slots as the number of deficient slots for the cluster C1 to the emission areas B5 to B8 belonging to the cluster C2 can compensate the deficiency of slots to be assigned to the cluster C1.

Figure 11:
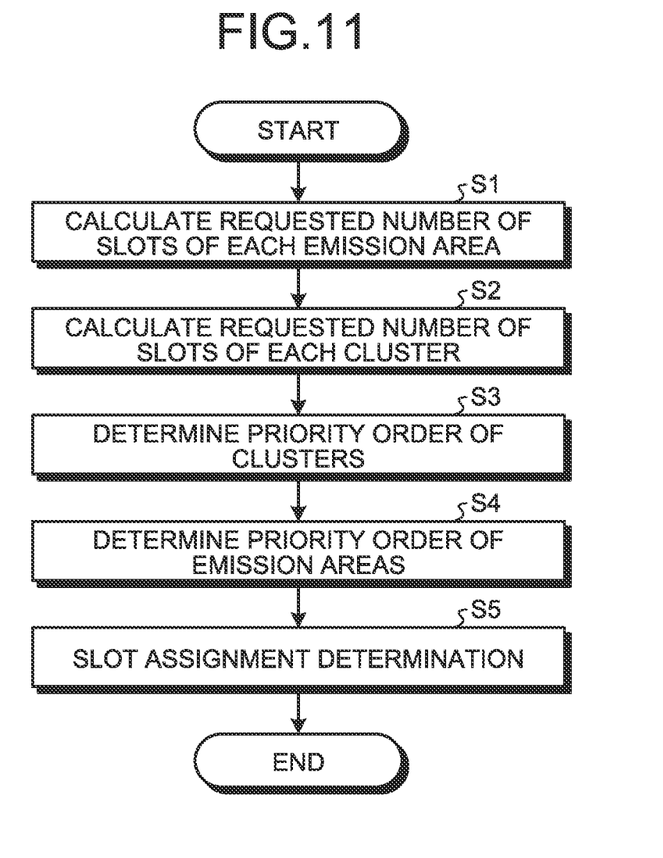
FIG. 11 is a flowchart illustrating an example control operation of the control station according to the first embodiment.

FIG. 11 is a flowchart illustrating an example control operation of the control station 103 according to the first embodiment. The control station 103 provides control based on the flowchart illustrated in FIG. 11 in a per slot basis to determine which slot is to be assigned to which emission area 200, and informs the relay station 101 of the result. Note that the control station 103 may provide the control based or the flowchart illustrated in FIG. 11 on a per frame basis to determine slot assignment, and inform the relay station 101 of the result.

The second transmission-reception unit 161 receives control information from a gateway 102, and stores the control information in the second storage unit 162. The control information is information needed for calculation of the requested number of slots of the emission area 200, and specifically includes the traffic amount requested by each of the terminals 105 and the line quality during communication between that terminal 105 and the gateway 102 through the relay station 101. The traffic monitoring unit 165 regularly adds up the traffic demand requested by a terminal 105 stored in the second storage unit 162, and performs operation such as averaging of the added-up traffic demand. The line quality monitoring unit 164 regularly adds up the line quality associated with a terminal 105 stored in the second storage unit 162, and performs operation such as averaging of the added-up line quality. The resource control unit 166 calculates the number of slots needed by the terminal 105 to transmit data based on the traffic demand and on the line quality, and sums up the required numbers of slots of the respective terminals 105 located in each of the emission areas 200, thus to calculate the requested number of slots for each of the emission areas 200 (step S1).

The resource control unit 166 sums up the requested numbers of slots of the respective emission areas 200 on a per cluster 210 basis to calculate the requested number of slots of each of the clusters 210 (step S2). Note that the combination of the emission areas 200 that form each of the clusters 210 follows a predetermined rule as illustrated in FIG. 8. In addition, the combination of the emission areas 200 that form each of the clusters 210 may be modified by the cluster control unit 167. For example, when the data transmission system 10 changes the coverage area currently in operation, there may be a change in the location to be irradiated with a beam, and therefore the configuration of the clusters 210 is then changed to compensate for the change in the locations to be irradiated with the beams. After the calculation of the requested number of slots of each of the clusters 210, the resource control unit 166 determines a priority order of the clusters 210 for performing slot assignment determination (step 33). Slot assignment determination, as used herein, is an operation of determining whether a beam is allowed to be emitted to an emission area 200 that is a candidate for slot assignment. Examples of the method of determining a priority order include to sort the clusters 210 in a descending order of the requested number of slots of each of the clusters 210 and to set the result of the sorting as the priority order for the slot assignment determination. By use of the descending order of the requested number of slots of each of the clusters 210 as the priority order, a reduction can be achieved in the probability of occurrence of deficiency in assignment of slots to a cluster 210. The resource control unit 166 determines a priority order of the emission areas 200 belonging to each of the clusters 210 (step S4). For example, one example is that the resource control unit 166 sorts the requested numbers of slots of the respective emission areas 200 in a descending order and sets the result of the sorting as the priority order for the slot assignment determination. By use of the descending order of the requested number of slots of each of the emission areas 200 as the priority order, a reduction can be achieved in the probability or occurrence of deficiency in assignment of slots to an emission area 200. Thus, the priority orders are determined for performing the slot assignment determination on a per cluster 210 basis and on a per emission area 200 basis.

After the determination of the priority orders on a per cluster 210 basis and on a per emission area 200 basis, the resource control unit 166 performs the slot assignment determination on the emission area 200 assigned high priority (step S5). In a case in which an emission area 200 is neighboring to another emission area 200 that belongs to another cluster 210 and is already assigned to the same slot, a beam will be emitted to that neighboring emission area 200 at the same time and at the same frequency. This will increase interference between beams in these emission areas 200. The resource control unit 166 therefore determines not to assign the slot to this emission area 200. In this case, slot assignment determination is performed using the emission area 200 assigned next higher priority as the candidate for assignment. If it is determined that the slot can be assigned, then assignment determination is performed on an emission area 200 belonging to the next higher priority cluster 210. When assignment determination has been performed on all the clusters 210, the process is terminated. The information indicating which slot is to be assigned to which emission area 200 determined in the slot assignment determination is referred to herein as slot assignment information.

After the determination of which emission area 200 is to be assigned to which slot(s), the control station 103 informs the relay station 101 of control information including the slot assignment information. Upon reception of the control information by the first transmission-reception unit 151, the control unit 150 stores the control information in the first storage unit 152. In addition, the switching control unit 154 generates, based on the slot assignment information, information for use by the switching unit 120 to assign the slots to the emission areas 200 irradiated with beams, and transmits this information to the switching unit 120. Moreover, the beam formation control unit 155 generates information for use the beam formation unit 130 to form the beams, and informs this information to the beam formation unit 130. In this operation, in a case in which the switching unit 120 is a channelizer, the information generated by the switching control unit 154 is switching information for controlling the switching unit of the channelizer. Moreover, the information generated by the beam formation control unit 155 may be determined de ending on the means for forming a beam. Examples of the means for forming a beam include means for forming a beam using a single feed, means for forming a beam using multiple feeds, means using an analogy phased array, and means using digital beam forming.

Note that, in the present embodiment, the emission areas 200 irradiated with beams are switched on a per slot basis, thereby requiring the gateways 102, the relay station 101, and the terminal 105 to be synchronized with the time of the control station 103 to transmit data based on the slot assignment information determined by the control station 103. To this end, the control unit 150 includes the first time management unit 153, and the control station 103 includes the second time management unit 163. The method of time management may be performed, for example, such that the control station 103, the relay station 101, the gateways 102, and the terminals 105 each receive a signal from a satellite positioning system for time keeping, or such that the control station 103 and the relay station 101 synchronize with each other, and the relay station 101 transmits a notification signal including time information to the gateways 102 and to the terminals 105 to synchronize the time.

As described above, the data transmission system 10 according to the present embodiment allows one emission area 200 to belong to multiple ones of the clusters 210 during the process of data transmission by a terminal 105 through the relay station 101, in which the control station 103 determines which emission area 200 is irradiated using which slot(s) on a per cluster 210 basis, thereby enabling data to be transmitted from multiple ones of the clusters 210 to any one of the emission areas 200. Accordingly, beams are emitted on a per cluster 210 basis, and at the same time, when the slots are deficient in a certain one of the clusters 210, an emission area 200 belonging to multiple ones of the clusters 210 can be assigned as many slots as the number of deficient slots. This enables the present embodiment to prevent increase in the numbers of frequency converters and of amplifiers in association with beam emission, of the relay station 101 while a desired number of slots can be assigned to each of the emission areas 200. This can in turn limit or prevent a reduction in time efficiency and a reduction in use efficiency of frequency in association with data transmission, the relay station 101.

Second Embodiment

The first embodiment has been described in which one emission area 200 belongs to multiple ones of the clusters 210, and the control station 103 determines which emission area 200 is irradiated using which slot(s) on a per cluster 210 basis, thereby enabling data to be transmitted from multiple ones of the clusters 210 to any one of the emission areas 200. However, the relay station 101 according to the first embodiment emits a beam to the emission area 200, specifically to a location that is selected, from a fixed arrangement, to inhibit multiple beams to overlap each other. This limits the location irradiated with a beam. This results in a lower signal to interference and noise power ratio (SINR) of a beam emitted by the relay station 101 when the terminal 105 is located at the boundary between one emission area 200 and another emission area 200 than when the terminal 105 is located in the center of an emission area 200. This requires the relay station 101 to use, during modulation of a signal, a transmission scheme that provides lower line quality to reduce the code rate, which will in turn cause a reduction in frequency use efficiency. In the present embodiment, the coordinate point to be irradiated with a beam is segmented, and the center coordinate point to be irradiated with the beam is determined to maximize the system throughput based on information such as the location of the terminal 105, thereby to improve the frequency use efficiency.

A data transmission system 10*a* according to a second embodiment includes a control station 103*a* in place of the control station 103 of the data transmission system 10. In addition, the control station 103*a* includes a resource control unit 166*a* in place of the resource control unit 166. The other part of the configuration is similar to the configuration of the data transmission system 10. Note that components having the same functionality in the present embodiment as the components of the first embodiment are designated by the same reference characters as the first embodiment, and duplicate description thereof will be omitted. A graphical illustration of the data transmission system 10*a* will also be omitted. In the present embodiment, the resource control unit 166*a* determines the location to be irradiated with each beam in each slot differently from the first embodiment.

Figure 12:
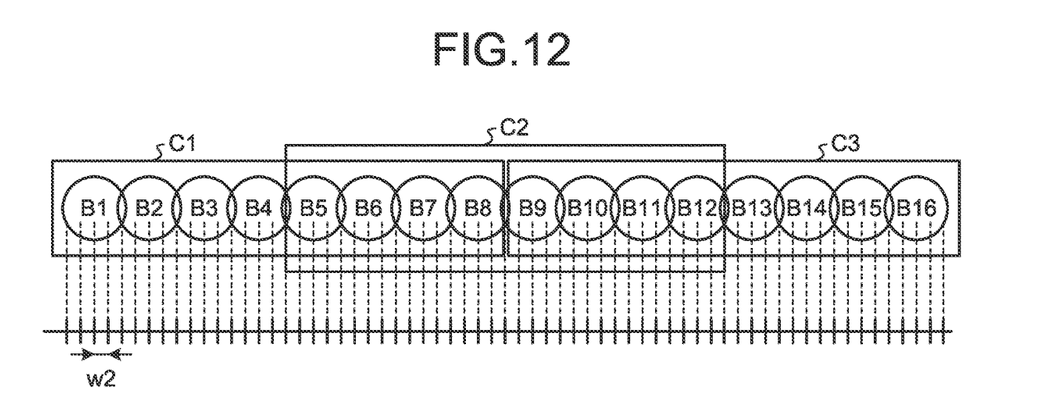
FIG. 12 is a diagram illustrating an example of locational relationships between clusters and emission areas according to a second embodiment.

FIG. 12 is a diagram illustrating an example of locational relationships between the clusters 210 and the emission areas 200 according to the second embodiment. As illustrated in FIG. 12, the present embodiment uses a distance w2 to represent the distance between the emission areas 200 in smaller segmentation than when the distance w1 is used in the first embodiment. That is, the number of candidates for the location to be irradiated with a beam illustrated in FIG. 8 is 8, which is the same as the number of beams for the cluster 210; but in FIG. 12, the number of candidates for the location to be irradiated with a beam can be increased depending on the value of the width of the distance w2. Note that the granularity of the distance w2 depends on accuracy of formation of the emission areas 200 by the beam formation unit 130. In this regard, digital beam forming can provide beam forming with high accuracy.

Figure 13:
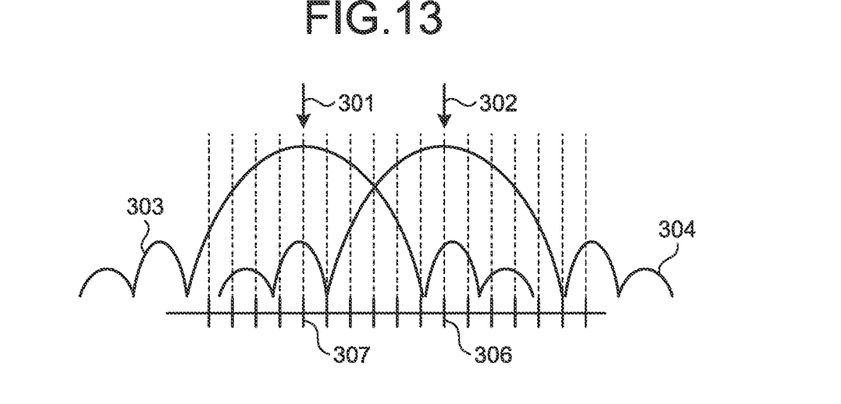
FIG. 13 is a diagram illustrating an example of locations of terminals and beam patterns according to the second embodiment.

An advantage of segmentation of the location to be irradiated with a beam will next be described. FIG. 13 is a diagram illustrating an example of locations of the terminals 105 and the beam patterns according to the second embodiment. In FIG. 9, the location to be irradiated with a beam is limited to the center coordinate point of a beam, thereby preventing the terminal 105 located at the location 301 from receiving data at a maximum SINR of the beam. This reduces the power received by the terminal 105, thereby causing the terminal 105 to communicate using a modulation scheme and a code rate that provide relatively low line quality. This reduces frequency use efficiency of the terminal 105. In the present embodiment, the resource control unit 166a segments the location to be irradiated with a beam with granularity of the distance w2 as illustrated in FIG. 13, and can thus select a coordinate point 307 and a coordinate point 306, which are each the center coordinate point of a beam where the terminal 105 can receive data at a maximum SINR of the beam at the location 301 and at the location 302. Thus, the present embodiment can improve the power received by the terminal 105 located at the location 301, and increase the frequency use efficiency of the terminal 105.

Figure 14:
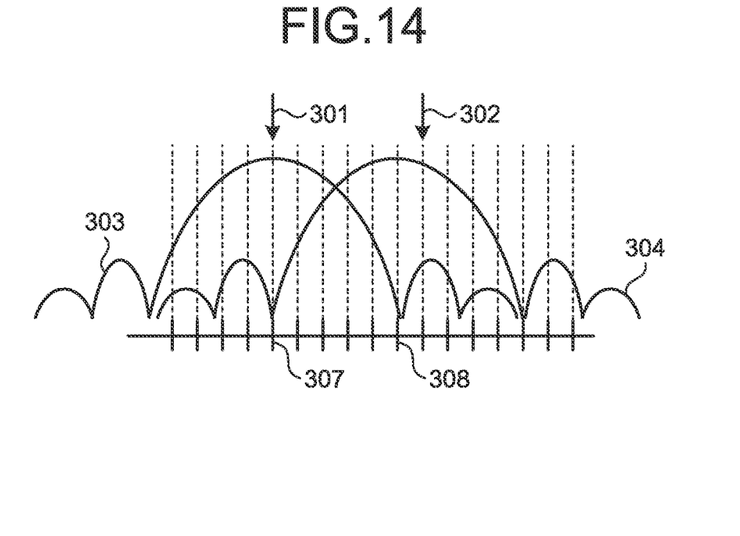
FIG. 14 is a diagram illustrating another example of locations of terminals and beam patterns according to the second embodiment.

FIG. 14 is a diagram illustrating another example of locations of the terminals 105 and the beam patterns according to the second embodiment. The resource control unit 166a determines, as illustrated in FIG. 14, a coordinate point 308 of the center of a beam to match the null point of the beam pattern 304 with the location 301 where the beam pattern 303 has the maximum SINR. The term null point refers to a point where the gain of a beam is low. This indeed results in a certain amount of reduction in the SINR of the beam pattern 304 at the location 302, but can significantly reduce interference between the beam pattern 303 and the beam pattern 304 at the location 301. Note that although FIG. 14 illustrates the beam pattern 303 and the beam pattern 304 as having the same beam pattern, the beam pattern 304 may have a different profile as long as the null point matches with the location 301 where the beam pattern 303 has the maximum SINR. In this case, such configuration can be achieved by informing the relay station 101 from the control station 103a of the location to be irradiated with the beam and the location of the null point to allow the beam formation unit 130 of the relay station 101 to form the beam to direct the null point to the specified location. In addition, the second transmission-reception unit 161 transmits the center coordinate point and the null point determined by the resource control unit 166a to the relay station 101.

Figure 15:
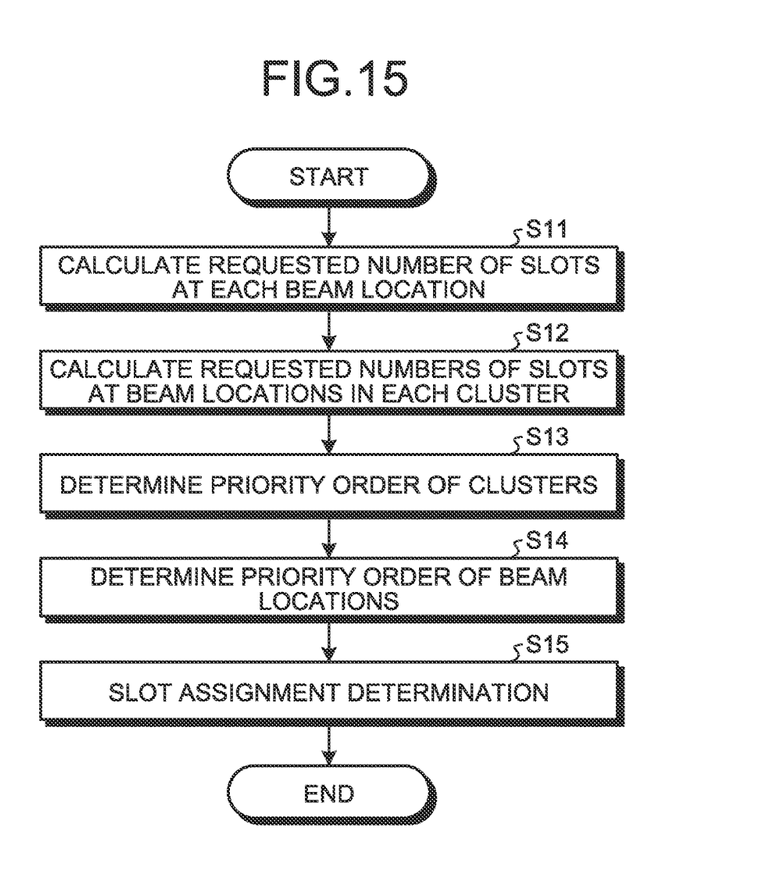
FIG. 15 is a flowchart illustrating an example control operation the control station according to the second embodiment.

An operation of the control station 103a will now be described. FIG. 15 is a flowchart illustrating an example control operation of the control station 103a according to the second embodiment. In the first embodiment, the resource control unit 166 calculate the requested number of slots of each of the emission areas 200, while in the present embodiment, the resource control unit 166a calculates the requested number of slots at each beam location (step S11). As used here, the term beam location refers to a location given in units of the distance w2, which is the resolution of the center coordinate point of each of the emission areas 200 illustrated in FIG. 12. In the example of FIG. 12, it is the sum of the requested numbers of slots of the respective terminals 105 located in each of the approximate quarters generated by division of the emission area 200. The resource control unit 166a calculates the sum of the requested numbers of slots at the respective beam locations of each of the clusters 210 (step S12), and determines a priority order of each of the clusters 210 for the slot assignment determination similarly to the first embodiment (step S13). The resource control unit 166a determines a priority order of the beam locations in each of the clusters 210 (step S14). The resource control unit 166a performs the slot assignment determination on a beam location that is the candidate for assignment based on the priority order (step S15). Note with respect to the slot assignment determination that in the first embodiment, the determination can be made based on whether the slot has already been assigned to the neighboring emission area 200; in the present embodiment, however, due to the segmentation of the location to be irradiated with a beam, the resource control unit 166a estimates the amount of interference between beams based on the beam pattern and on the distance from the emission area 200 that has a slot already assigned thereto, and thereafter determines the slot assignment to achieve the highest line quality, that is, the maximum SINR.

Figure 16:
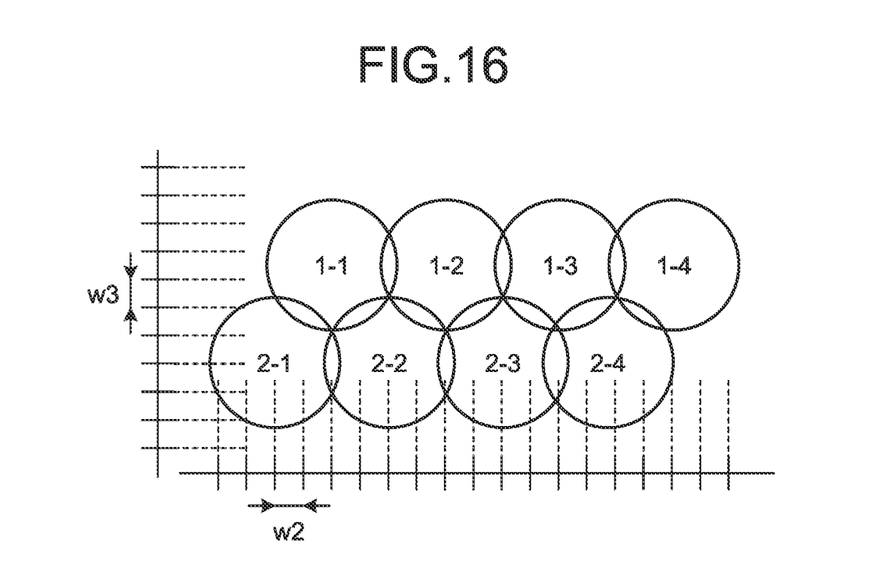
FIG. 16 is a diagram illustrating an example of beam locations according to the second embodiment.

FIG. 16 is a diagram illustrating an example of beam locations according to the second embodiment. The second embodiment has been described in which the beam locations are determined one-dimensionally using the distance w2 as illustrated in FIG. 12, but as illustrated in FIG. 16, the beam locations may be determined two-dimensionally using the distance w2 and a distance w3. In the two-dimensional determination, use of different polarized waves for the emission area 1-1 and for the emission area 2-1 for transmission, or use of different frequencies for the emission area 1-1 and for the emission area 2-1 for transmission prevents interference between the emission areas 200 even when the center location of one of the emission areas 200 is changed.

Figure 17:
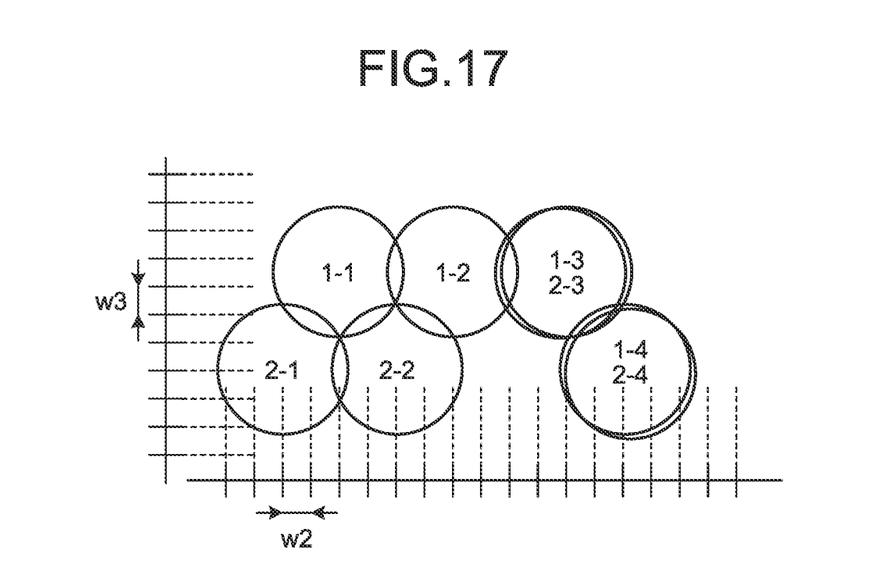
FIG. 17 is a diagram illustrating another example of beam locations according to the second embodiment.

FIG. 17 is a diagram illustrating another example of beam locations according to the second embodiment. As illustrated in FIG. 17, multiple beams may be emitted to the same coordinate point simultaneously. For example, multiplex transmission of a beam to the emission area 1-3 and to the emission area 2-3 using different polarized waves enables data to be transmitted to a terminal 105 with a double transmission capacity.

As described above, in the present embodiment, the control station 103a segments the center coordinate point to be irradiated with the beam, and determines the center coordinate point to maximize the system throughput based on information such as the location of the terminal 105. This enables the frequency use efficiency to be improved as compared to when the center coordinate point is limited, and in turn, can limit or prevent a reduction in time efficiency and a reduction in use efficiency of frequency in association with data transmission.

A relay station according to the disclosure provides an advantage in being capable of limiting or preventing a reduction in time efficiency and a reduction in use efficiency of frequency in association with data transmission.

The configurations described in the foregoing embodiments are merely examples. These configurations may be combined with a known other technology, and moreover, a part of such configurations may be omitted and/or modified without departing from the spirit.

What is claimed is:

1. A relay station comprising:
a beam former configured to emit a plurality of beams to a plurality of respective emission areas, the beam former forming clusters each from two or more of the emission areas and emitting the beams based on assignment information that is generated based on a priority order of the clusters, the assignment information indicating which slot is assigned to which of the emission areas for each of the clusters, wherein
one of the emission areas belongs to multiple ones of the clusters.

2. The relay station according to claim 1, wherein the clusters are arranged in a planar arrangement to constitute a coverage area.

3. The relay station according to claim 2, wherein
the coverage area is formed by use of the clusters each formed of the emission areas that are arranged along a line, and
the beams having frequencies different from each other or having polarized waves different from each other are used in the clusters.

4. The relay station according to claim 1, wherein the beam former emits the beams having polarized waves different from each other or having frequencies different from each other at a same time and to a same coordinate point.

5. A data transmission system comprising:
the relay station according to claim 1; and
a control station comprising:
a resource controller to perform assignment of a polarized wave and a frequency of a beam to be emitted by the relay station, and to make a determination of assignment of a slot to a cluster; and
a transceiver to transmit, to the relay station, a center coordinate point to be irradiated with the beam and a null point of a beam pattern of the beam.

6. A control station configured to communicate with a relay station, the relay station comprising a beam former configured to emit a plurality of beams to a plurality of respective emission areas, the beam former forming clusters each from two or more of the emission areas and emitting the beams based on assignment information that is generated based on a priority order of the clusters, the assignment information indicating which slot is assigned to which of the emission areas for each of the clusters, and one of the emission areas belonging to multiple ones of the clusters, the control station comprising:
a resource controller to perform assignment of a polarized wave and a frequency of a beam to be emitted by the relay station, and to make a determination of assignment of a slot to a cluster; and
a transceiver to transmit, to the relay station, information corresponding to the assignments performed and determined by the resource controller, and a center coordinate point to be irradiated with the beam and a null point of a beam pattern of the beam.

7. The control station according to claim 6, wherein the control station includes a cluster controller to change a combination of the emission areas belonging to the cluster.

8. The control station according to claim 6, wherein the resource controller determines the center coordinate point to result in a maximum signal to interference and noise power ratio of the beam emitted based on a location of a terminal.

9. The control station according to claim 6, wherein the resource controller determines the center coordinate point of a beam for one terminal to match a null point of a beam to be emitted to the one terminal with a location where a beam to be emitted to another terminal has a maximum signal to interference and noise power ratio.

10. The control station according to claim 6, wherein the resource controller changes the beam pattern of one terminal to match a null point of a beam to be emitted to the one terminal with a location where a beam to be emitted to another terminal has a maximum signal to interference and noise power ratio.

11. A data transmission method for transmitting data to a terminal by emission of a beam by a relay station that is configured to emit a plurality of beams to a plurality of respective emission areas, under control of a control station, the data transmission method comprising:
forming clusters each from two or more of the emission areas and emitting the beams based on assignment information that is generated based on a priority order of the clusters, the assignment information indicating which slot is assigned to which of the emission areas for each of the clusters, wherein
one of the emission areas belongs to a plurality of the clusters.

12. The data transmission method according to claim 11, comprising:
performing assignment of a polarized wave and a frequency of a beam to be emitted by the relay station and making a determination of assignment of a slot to a cluster; and
transmitting, to the relay station, a center coordinate point to be irradiated with the beam and a null point of a beam pattern of the beam.

13. A control circuit for controlling a relay station that is configured to emit a plurality of beams to a plurality of respective emission areas, the control circuit causing the relay station to perform:
a beam formation of forming clusters each from two or more of the emission areas and emitting the beams based on assignment information that is generated based on a priority order of the clusters, the assignment information indicating which slot is assigned to which of the emission areas for each of the clusters, wherein
one of the emission areas belongs to multiple ones of the clusters.

14. A non-transitory computer-readable recording medium storing therein a program for controlling a relay station that is configured to emit a plurality of beams to a plurality of respective emission areas, the program causing the relay station to perform:
a beam formation of forming clusters each from two or more of the emission areas and emitting the beams based on assignment information that is generated based on a priority order of the clusters, the assignment information indicating which slot is assigned to which of the emission areas for each of the clusters, wherein
one of the emission areas belongs to multiple ones of the clusters.

* * * * *